Dec. 11, 1951  D. G. TAYLOR  2,578,026
CONTROL APPARATUS
Filed Sept. 1, 1945  2 SHEETS—SHEET 1
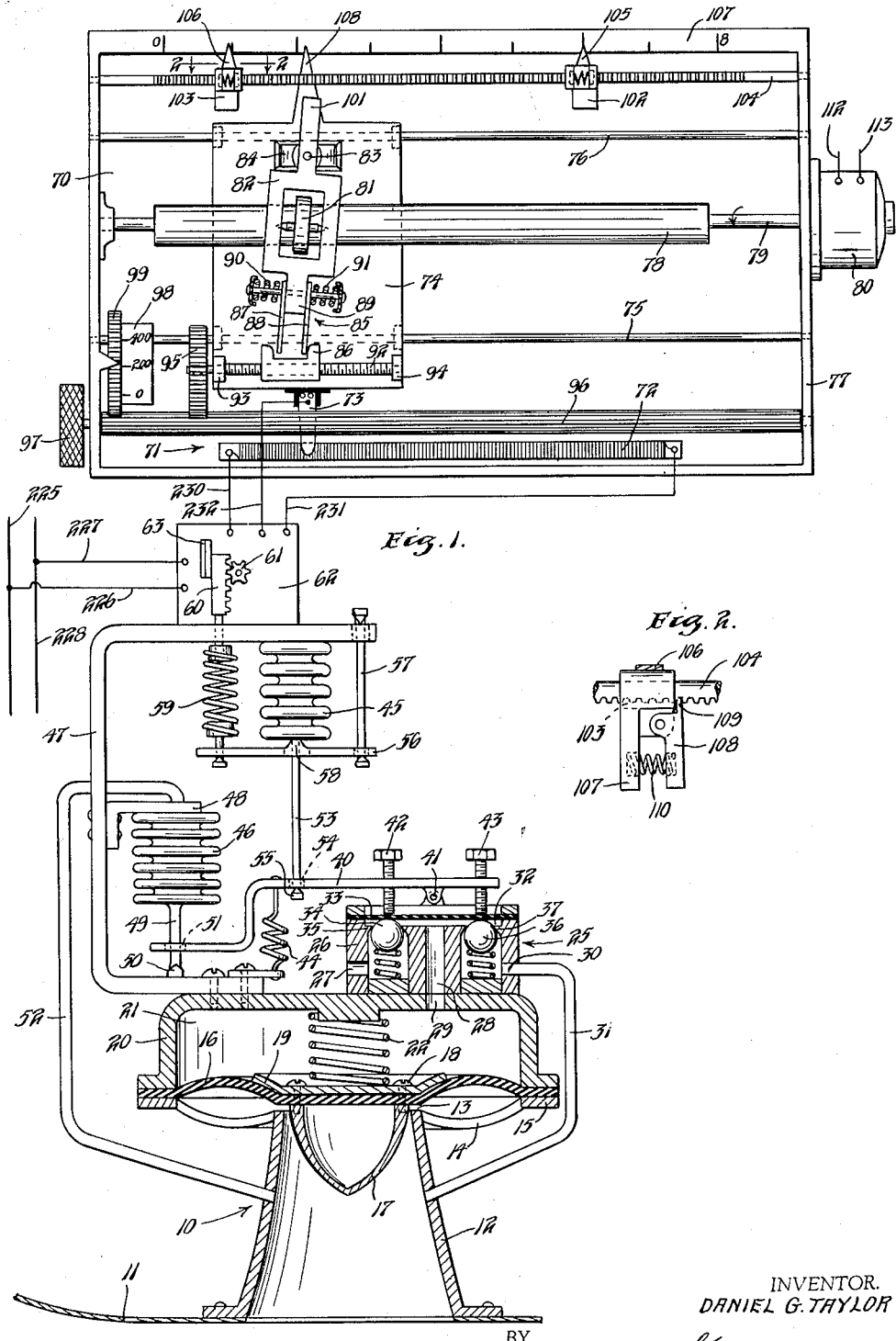
INVENTOR.
DANIEL G. TAYLOR
BY
George H. Fisher
ATTORNEY.

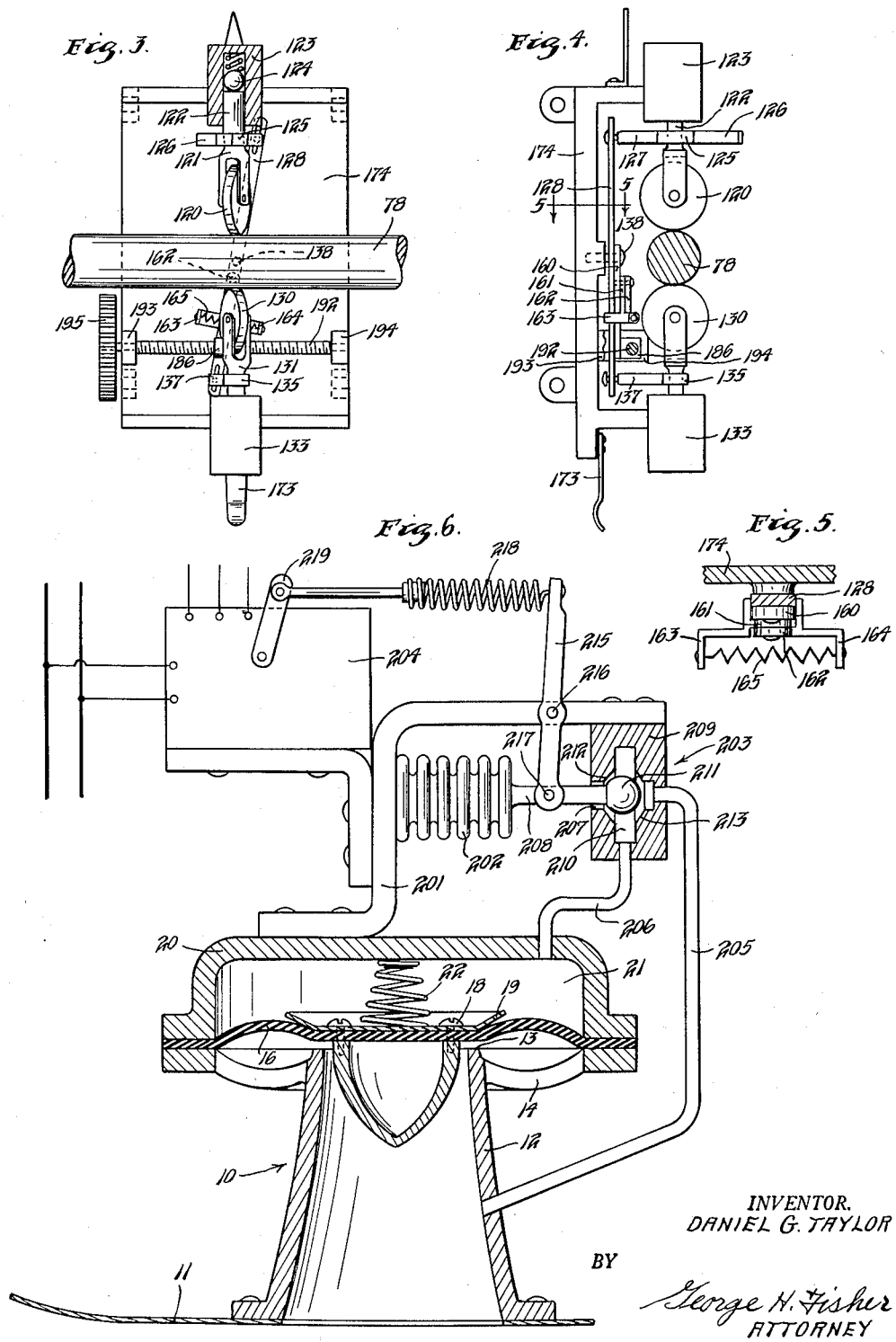

Patented Dec. 11, 1951

2,578,026

UNITED STATES PATENT OFFICE 2,578,026

CONTROL APPARATUS

Daniel G. Taylor, Minneapolis, Minn., assignor to Minneapolis-Honeywell Regulator Company, Minneapolis, Minn., a corporation of Delaware Application September 1, 1945, Serial No. 614,086

10 Claims. (Cl. 98—1.5)

The present apparatus relates to means for controlling the air pressure within the cabin of a pressurized aircraft.

A feasible way of supercharging or pressurizing an aircraft cabin is to furnish an adequate supply of air to the cabin under a pressure at least as high as that desired in the cabin and to control the pressure within said cabin by controlling the air outflow from said cabin. To make this system practical, however, it is necessary that the outflow control means be operable under a wide range of conditions and be accurately and easily controllable under any of said conditions. The present apparatus provides an outflow valve and control means therefor which meets the demand for such apparatus.

It is thus a principal object of this invention to provide an improved outflow valve and control means therefor for use in controlling the air pressure of the cabin of an aircraft.

It is a further object to provide an air outflow valve and control means therefor which are simple and easily manufactured. Closely related to this, it is also an object to provide such apparatus requiring a minimum of servicing.

It is an object to provide aircraft cabin pressure control apparatus which is unusually rugged and capable of withstanding without impairment the adverse conditions to which an aircraft may be subjected.

It is a further object to provide cabin pressure control apparatus in which the components are connected by simple electrical wiring, thus permitting each of the components to be located in its most advantageous position.

It is an additional object to provide cabin pressure control apparatus having low power requirements from the aircraft's auxiliary power system and wherein auxiliary power is used only for control, the power for operation of the valve being obtained from the differential air pressure existing between that in the cabin and that of the atmosphere.

It is an object to provide improved cabin pressure control apparatus wherein the upper and lower limits of pressure and the rate of change of pressure are easily adjusted.

It is a further object to provide improved cabin pressure control apparatus wherein means are provided for positively limiting the maximum differential pressure that is imposed on the aircraft structure.

It is also an object to provide means for controlling the rate of change of pressure of an aircraft cabin wherein the rate of change is gradually reduced to zero as the desired limit is reached.

It is a further object to provide control apparatus for adjusting a control means wherein the limits of adjustment and the rate of adjustment are each individually adjustable and wherein the means causing the change of adjustment is driven by a constant speed motor.

It is another object to provide an outflow valve for an aircraft cabin comprising a flexible diaphragm subject to a controlled pressure on one side and to cabin pressure on its other side.

These and other objects will become apparent upon a study of the following specification and drawings wherein:

Figure 1 shows a schematic embodiment of the present apparatus.

Figure 2 is an enlarged plan view taken on line 2—2 of Figure 1.

Figure 3 is a front elevation of a modified member usable in the apparatus of Figure 1.

Figure 4 is a side elevation of the member of Figure 3.

Figure 5 is an enlarged fragmentary plan view, parts in section, taken on the line 5—5 of Figure 4 and showing the strain release means of Figures 3 and 4.

Figure 6 is an elevational view, with parts in section, of a modified valve construction.

The apparatus of Figure 1 is schematically shown in its operative relation in the pressurized cabin of an aircraft, only a small portion of which is shown, valve 10 being attached to the outer skin 11 of the airplane. The supply of air for the cabin may be from any suitable source such as a compressor, or may be bled from the discharge of one or more of the turbo superchargers for the engines of the aircraft. Further, it is assumed that the supply of air will be at a pressure at least as high as that desired in the cabin and that the quantity of air supplied will be kept within reasonable limits. As the means for supplying air to the cabin is no part of this invention, disclosure of the same has been omitted. However, reference is made to my copending application, Serial No. 569,759, filed December 26, 1944, now Patent No. 2,471,292, issued May 24, 1949, for a disclosure of a suitable air supply means for a pressurized cabin.

Valve 10, which controls the outflow of air from the cabin, includes an outlet passage or conduit 12 having a seat portion 13, radially extending arms 14 and a diaphragm mounting flange 15. A flexible diaphragm 16 extends across said seat portion and said mounting flange and forms the closure member for the outlet passage and also the operating means of the valve. Any suitable material may be used for this diaphragm including leather, rubber, rubber-like material and the like. A synthetic rubber (Buna N) diaphragm with a reinforcing web of nylon has been found to be excellent for this purpose. A depending curved plug-like member 17 is attached to the lower surface of diaphragm 16 by screw means 18 extending through stiffener plate 19 and said diaphragm 16. Member 17 extends into outlet passage 12 and improves the flow characteristics and modulation of the valve. A chamber 21 is formed above diaphragm 16 by cap means 20 attached in sealing relation to said diaphragm at its outer edges and to diaphragm mounting flange 15 by suitable means, not shown. A light spring means 22 extends between said cap 20 and stiffener plate 19 to urge diaphragm 16 into a closed position.

To control the action of diaphragm 16 of outlet valve 10, a pilot valve 25 is located above cap member 20. Pilot valve 25 includes a body portion 26, passage 27 communicating with the cabin air, a passage 28 communicating through opening 29 in cap member 20 with chamber 21, and a passage 30 communicating through tube 31 with the inside of the outlet passage 12 of valve 10. Passage 28 of pilot valve 25 also communicates with a valve chamber 32 formed by the valve body and a thin flexible diaphragm 33. A spring urged ball 34 is urged against seat 35 to seal passage 27 from valve chamber 32, while spring urged ball 36 is urged against seat 37 to seal valve chamber 32 from passage 30. An operating arm 40, pivoted at 41, carries adjustable pilot valve operating means 42 and 43. Adjustable means 42 and 43 are in such alignment that they register with ball valve members 34 and 36, respectively, and are adjusted so that, with arm 40 in neutral position and with said ball valve members each against its rest, each of said means holds the flexible diaphragm down into engagement with its respective ball valve member. If operating lever 40 now be slightly rotated in a clockwise direction, ball valve member 36 will be pushed from its seat 37 and will permit communication between valve chamber 21, opening 29, passage 28, valve chamber 32, passage 30, tube 31 and the inside of the outlet passage of the outlet valve. However, if the operating lever 40 should be rotated in a counterclockwise direction, ball valve 34 would be depressed and communication would exist between passage 27, valve chamber 32, passage 28, opening 29, and valve chamber 21. Operation of lever member 40 thus determines whether valve chamber 21 is to be sealed off or to communicate with either the air in the cabin or that in the outlet passage 12 of valve 10. For reasons which will appear, lever member 40 is biased in a counterclockwise direction by spring means 44.

Lever member 40 is operated by an absolute pressure responsive bellows assembly 45 and a differential pressure responsive bellows assembly 46, both bellows assemblies being carried by a bracket 47 attached to cap member 20 of the valve 10. The differential pressure responsive bellows 46 comprises a conventional bellows having an internal spring tending to extend the same. This bellows is attached to bracket member 47 by angular member 48 and operates lever 40 by means of a tension rod 49 having a pivot member 50 which engages, at times, lever 40 on either side of hole 51 in said lever member. The outside of bellows 46 is exposed to the air pressure within the cabin of the aircraft and the inside of the bellows is connected by tubes 52 to the outlet passage 12 of valve 10. This bellows is so arranged that bellows 46 remains in a somewhat extended position until the difference between cabin pressure and the pressure in the outlet passage of the valve rises to a predetermined value at which value pivot portion 50 is pulled into engagement with lever 40 and rotates same in a clockwise direction.

Bellows 45 comprises a conventional evacuated bellows having a spring therein for extending the same and responds to the absolute pressure of the air in the cabin. This bellows actuates tension member 53 extending through an opening 54 in lever 40 to a pivot portion 55. This bellows is so arranged that an increase in absolute pressure tends to contract bellows 45 thus pulling member 53 upward and tending to rotate lever 40 by means of pivot means 55 in a clockwise direction. A decrease in absolute pressure permits an expansion of bellows 45, a downward movement of tension member 53 and tends to permit a movement of pivot means 55 away from lever 40, thus permitting spring 44 to pull lever 40 in a counterclockwise direction.

To adjust the effect of bellows 45, a lever member 56 is carried at one end by a pivoted link 57 and engages the bottom of bellows 45 by fulcrum means 58. To pull fulcrum means 58 into engagement with bellows 45, spring means 59 is attached to the other end of member 56. Spring means 59 is adjustable by means of a rack 60 coacting with pinion 61 of a reversible motor means 62. A guide means 63 is provided to keep rack 60 in engagement with pinion 61. Spring means 59 is so arranged that it exerts a minimum force tending to contract bellows 45 at a sea level pressure adjustment and exerts a maximum force tending to contract bellows 45 at the maximum altitude to which the cabin pressure can be adjusted.

Motor means 62 may be of any conventional reversible sort but preferably is of the proportioning type described in my Patent 2,028,110. This sort of motor means includes a balanced relay and a follow-up potentiometer and functions in a manner to rotate one way or the other and to an extent depending upon the movement of a controlling potentiometer. This type of proportioning control is so well known to those skilled in the art that no further description is believed necessary.

A controller 70 is provided for controlling motor means 62 and includes a potentiometer 71 having an elongated resistor 72 and a wiper 73. Wiper 73 is attached to and electrically insulated from a movable member or carriage 74. Movable member 74 is slidably mounted on guide rods 75 and 76 extending between the ends of housing 77 of the controller. To move member 74 along guide rails 75 and 76 and thereby adjust potentiometer 71, a cylinder 78 carried by shaft 79 is slowly rotated by a geared constant speed motor 80. Coacting with slowly rotating cylinder 78 is a caster wheel 81 rotatably mounted in a pivoted yoke-like member 82. Member 82 is pivoted at 83 on a pedestal 84 forming part of member 74. The lower end of member 82 comprises a strain-release means 85 which coacts with a traveling notched and threaded member 86. Spring-release means 85 comprises a pair of blades 87 and 88 held against tongue 89 of member 82 by spring means 90 and 91. The tension of spring means 90 and 91 is such that movement of threaded member 86 is normally able to tilt member 82 in one direction or another, or to hold said member in a neutral position, blades 87 and 88 being held flat against tongue member 89. However, under circumstances to be described, member 82 may pivot about 83 without a corresponding movement of member 86 by reason of strain-release means 85.

The position of member 86 is adjusted by means of a threaded shaft 92 carried in bearing members 93 and 94 and rotated by gear 95. Gear 95 is in turn rotated by an elongated pinion or splined shaft 96 extending approximately the length of housing 77. Elongated pinion 96 is rotated by manual adjusting knob 97. To indicate the position or adjustment of member 86, an indicating drum 98 is rotated by gear means 99 meshing with said pinion 96. In the position shown, member 86 is adjusted to a position left of its center position so that member 82 has positioned caster wheel 81 at a slight angle to rotating cylinder 78. With cylinder 78 rotating in a clockwise direction, looking toward the motor, and with the inclination of the caster wheel described, carriage member 74 will be driven toward the right by the coaction of said wheel 81 and said cylinder. Movement of member 74 to the right likewise causes movement of potentiometer wiper 73 to the right across resistor 72 and causes a follow-up motion of motor means 62 in a manner to tighten spring means 59. Obviously, the greater the inclination of caster wheel 81 relative to cylinder 78, the greater the speed of member 74 to the right. However, if caster wheel 81 be so arranged that its axis is parallel to that of the cylinder, there will be no translatory motion of carriage member 74. In addition, should member 82 and caster wheel 81 be inclined in the opposite direction, carriage member 84 would then move to the left.

With a motion of carriage member 74 to the right, as above described, such motion will continue until an extension member 101 of member 82 engages stop means 102. When extension member 101 engages stop member 102, the upper portion of member 82 is prevented from moving to the right, but as the force tending to move carriage member 74 to the right is greater than that exerted by strain release means 85, the angle of member 82 and caster wheel 81 relative to cylinder 78 gradually shifts to a neutral position, thus stopping member 74. A similar stop member 103 is provided for limiting motion of member 74 to the left. Stop members 102 and 103 are adjustable along a notched rod 104 and their position is indicated by pointers 105 and 106, respectively, in conjunction with suitable indicia 107 carried by housing 77. As a means of indicating the position of carriage member 74 at all times, a pointer 108 is carried by 74 and also coacts with said indicia 107. Preferably, pointer 108 is arranged so that it may slide under pointers 105 and 106 so that it can be in registry therewith when said member 74 has reached either of its end positions. While stop means 102 and 103 may be of any suitable type, Figure 2 illustrates a satisfactory sort. Figure 2 is taken on the line 2—2 of Figure 1 and shows a top plan view of stop 103, pointer 106 being in section. Stop member 103 comprises a stationary handle member 107 and a pivoted member 108 having a notch engaging flange 109 for engaging the notches in rod 104. A spring 110 tends to spread handles 108 and 107 and to force said flange 109 into notch engaging position. As before mentioned, stop means 102 and 103 may be of any suitable sort and the above described example is merely illustrative of one practical type.

As previously mentioned, many substitutions and equivalents can be readily made in the described apparatus. In this regard, Figures 3 and 4 show a modified movable member or carriage means 174 for movement along guide rods 75 and 76. Figure 3 is a front elevation view, with a portion in section, and Figure 4 is a side elevation view of movable means 174 in its relation to cylinder 78. In this modification, two caster wheels are used in opposing relation, this form, although more complicated, being desired because it does not transmit the pressure of the caster wheels to the guide rods 75 and 76. In Figures 3 and 4, top caster wheel 120 is rotatably mounted in member 121. An extension portion 122 of member 121 extends into a socket member 123 and bears against the spring urged thrust bearing 124. The spring urged thrust bearing 124 keeps caster wheel 120 in firm engagement against cylinder 78. As is noted from the drawing, member 122 is pivotally associated with socket 123 but free rotation of 121 is prevented by means to be described. A transverse member 125 is carried by member 121 and has a forward extending portion 126 for engaging stop means 102 or 103 and has a rearwardly extending portion 127 having a pin and slot connection with pivoted lever 128.

In opposed relation to caster wheel 120 is caster wheel 130 carried by member 131 and having a portion journaled in socket member 133 in the same manner as above described. Member 131 having a rearwardly extending portion 137 conis maintained in a rotated position by member 135 nected in pin and slot relation with the aforesaid lever 128. Socket member 133 has the same spring urged thrust bearing construction as socket member 123 so that caster wheel 130 is spring urged into engagement with cylinder 78 in the same manner as caster wheel 120. However, because the center portion of lever member 128 is pivoted at 138, caster wheels 120 and 130 are inclined a like amount but in opposite directions relative to cylinder 78. This is quite proper for causing movement of member 174 relative to 78 because of the apparent opposite direction of motion of the top and bottom surfaces of rotating cylinder 78. With an opposite inclination of caster wheels 120 and 130, rotation of rod 78 will cause movement of member 174 in a direction and at a speed depending upon the amount of inclination of said caster wheels relative to said cylinder. To adjust the inclination of these caster wheels, a pivotally mounted threaded nut 186 is carried on threaded shaft 192, said threaded shaft being carried by bearing members 193 and 194, as in the previous example. Threaded shaft 192 is rotated by gear means 195 adjustable by elongated pinion 96 and knob 97 in the manner previously related.

Nut 186 is pivotally mounted on strain-release means including a lever member 160 which is also pivoted at 138. Lever member 160 has associated therewith a pair of pivotally mounted detent members 161 and 162 having portions 163 and 164 straddling levers 160 and 128 in abutting relation and being held in such relation by spring means 165, as best shown in Figure 5. Because of spring means 165 holding members 163 and 164 in abutting relation against levers 160 and 128, movement of nut 186 due to rotation of shaft 192 normally causes rotation of pivoted lever 128, but excessive pressures are avoided by the strain release means including spring 165. Thus, if member 174 be moved in one direction or another until extending member 126 engages a stop, the inclination of caster wheels 120 and 130 will gradually be shifted to a neutral position, even though nut 186 does not move, by virtue of the aforesaid strain release means. Thus, it is noted that carriage member 174 functions in a similar fashion to that described in Fig. 1.

While the outlet valve shown in Figure 1 and the pilot valve in control thereof is the preferred apparatus for use in the present invention, the valve shown in Figure 6 with its modified operating apparatus is also of importance where a simpler mechanism is desired. Certain of the outlet valve parts are the same as those in Figure 1 and are similarly numbered. The control means for this valve is attached to a bracket 201 and includes an evacuated bellows 202, a pilot valve structure 203, and an operating motor means 204, similar to motor means 62. Pilot valve 203 comprises a body portion 209 having an internal chamber 210, said chamber being in direct communication with chamber 21 of valve 10 through tube 206. Chamber 210 communicates with the air in the cabin through opening 207 surrounding valve rod 208 and is connected with the outlet passage 12 of valve 10 by tube 205. A ball valve member 211 attached to valve rod 208 coacts with valve seat 212 to control the flow of air from the cabin to chamber 210, and said valve member 211 coacts with valve seat 213 to control the flow of fluid from said valve chamber 210 to the outlet passage of valve 10 through tube 205. Movement of valve rod 208 to the left brings ball valve member 211 into engagement with valve seat 212, whereas movement of valve rod 208 to the right brings the valve member 211 into engagement with valve seat 213. In intermediate positions, the air pressure in chamber 210 will depend upon the rate of air leakage between valve member 211 and the respective seats. In the position shown, the air can escape between valve member 211 and seat 213 more readily than it can enter through opening 207 and pass between seat 212 and said valve member 211, therefore the pressure in chamber 210 approaches that existing in the outlet passage 12 of valve 10.

To prevent collapse of bellows 202, lever 215 is pivoted to support 201 at 216 and to valve rod 208 at 217. This lever is biased in a counterclockwise direction by spring means 218 attached to the upper end of lever 215, and adjusted by lever 219 of motor means 204. Rotation of lever 219 in a clockwise direction tends to loosen spring means 218 and thus permit a lower pressure to contract bellows 202 and to move valve member 211 toward seat 212. Likewise, a counterclockwise rotation of lever 219 tightens spring means 218 and thus requires a greater pressure to cause a contraction of bellows 202. Motor means 204 is preferably of the same type described in Figure 1 and is controlled from controller 70 in a similar manner.

While certain alternative structure has been shown, it is obvious from a study of the present disclosure that many other substitutions and alterations can be made. Therefore, in the following description of the operation, the function of the apparatus, rather than its specific form, should be kept in mind.

Operation

With the above described apparatus installed in an aircraft having a suitable air supply for its cabin, the pressure of the air in the cabin is regulated by controlling outflow of the air through valve 10, in a manner to be described. Controller 70 is arranged to control the operation of valve 10 and is connected to motor means 62 by wiring as follows: the left end of the resistor 72, wire 230, motor means 62, wire 231, the right end of said resistor; wiper 73, and wire 232 to said motor means 62. Current for operation of motor means 62 is obtained from a suitable supply by the circuit: line wire 225, wire 226, motor means 62, wire 227, and line wire 228.

Motor 80 of controller 70 receives its energizing current from a suitable source, such as line wires 225 and 228, through wires 112 and 113, the connections being omitted.

As shown, stop 103 which provides the lower limit of cabin pressure, in terms of altitude, is adjusted to a position corresponding to about 1000 feet of altitude, while stop 102, the stop providing the upper limit of cabin pressure, is adjusted to a point corresponding to an altitude of about 6000 feet. As the cabin pressurizing apparatus need not be used until the aircraft has actually begun its flight, it will be assumed that the aircraft in which the present apparatus is installed has taken off from a field at about 1000 feet elevation and is climbing at a predetermined rate. As shown, control knob 97 of the cabin pressure controller has been adjusted for a rate of change of pressure corresponding to 200 feet of altitude change per minute, this adjustment being made soon after leaving the ground. In the position shown in Figure 1, carriage member 74 has moved to the right due to the said adjustment and the rotation of cylinder 78, to a position indicating that the cabin pressure is being controlled to a value corresponding to about 2100 feet of elevation. As the airplane continues to climb, and as member 74 continues to be driven to the right by rotation of cylinder member 78 and the inclined caster wheel 81, the pressure in the cabin continues to vary due to the action of controller 70.

The manner in which the operation of controller 70 causes a change in cabin pressure may now be determined. As before noted, the under side of diaphragm 16, excepting that portion covering the outlet passage 12, is exposed to cabin pressure. Assuming that the space in chamber 21 is also equal to cabin pressure, the valve will be closed due to the action of spring 22. However, as before noted, air is being supplied to the cabin and the pressure in the cabin is gradually being changed. Likewise, the pressure in outlet passage 12 of valve 10 is also changing, and at a greater rate, due to the climb of the airplane being at a higher rate than it is desired to change the cabin pressure.

As previously noted, at any particular adjustment of evacuated bellows 45, an increase in cabin pressure will tend to cause contraction of the bellows and rotation of lever member 40 in a clockwise direction. Increase in cabin pressure will then cause operation of pilot valve 25 to permit communication between chamber 21 and the outlet passage 12 of the valve. With the pressure in the cabin in excess of that in the outlet passage and with the pressure in chamber 21 corresponding to that in the outlet passage, diaphragm 16 tends to be forced upwardly by the excess of cabin pressure over that in chamber 21. The outlet valve is thus partially opened to allow an outflow of cabin air. Thus, an increase in cabin pressure affects bellows 45 in a manner to operate pilot valve 25 to cause opening of outlet valve 10 and permit release of the excess air. In Figure 1, the outlet valve is shown partly open so that airflow from the cabin can take place. With controller 70 operating to readjust potentiometer 71, by movement of wiper 73 to the right across resistor 72, motor means 62 is operated to rotate pinion 61 in a clockwise direction and thus raise rack 60 which tightens spring means 59. Tightening spring means 59 tends to force a contraction of bellows 45 and thus requires a lower absolute pressure, or increased altitude pressure, affecting bellows 45 to maintain an equilibrium position. This readjusting of the effect of bellows 45 tends to open the valve as the aircraft cabin pressure is raised, in terms of altitude. Thus, at any particular adjustment of bellows 45 by controller 70, an increase in cabin pressure will cause clockwise rotation of lever member 40, operation of pilot valve 25 to lower the pressure in chamber 21, and an opening of the outlet valve which will tend to relieve the pressure. A decrease in pressure in the cabin will cause an extension of bellows 45 which permits spring 44 to rotate lever member 40 in a counterclockwise direction, thus operating pilot valve 25 to permit the pressure in chamber 21 to rise to the same value as that in the cabin, thus causing closing of diaphragm 16 due to spring 22. Because movement of diaphragm 16 in either an opening or closing direction results in a rapid change in cabin pressure, the diaphragm will normally operate at an equilibrium position and thus give a modulated control of the airflow and the desired control of pressure. Should the controlling action of the valve be too rapid and instability result, the valve action may be slowed down by suitable restrictions to flow (not shown) in the passages of the pilot valve. With the adjustment shown, carriage member 74 will move to the right, and the cabin pressure will be varied, until extension 101 engages stop 102. When this happens, because caster wheel 81 is still inclined, carriage member 74 tends to keep on moving to the right. However, extension portion 101 cannot move further to the right because of the aforesaid stop. Therefore, member 82 is pivoted about 83 and gradually lessens the inclination of the axis of caster wheel 81 with cylinder 78 and slows the rate of movement of carriage member 74 to the right. When this rotation of member 82 is such that the caster wheel rotates on an axis parallel to that of cylinder 78, there is no more tendency for carriage member 74 to move to the right and movement stops. Assuming that this has taken place, and that the aircraft has continued to climb to an altitude of, say 18,000 feet, at which it levels off. Under these conditions, the cabin pressure will be maintained at a value corresponding to 6,000 feet of altitude by action of bellows 45 in the manner previously related. Assume now that the spring in bellows 46 is such as to permit a differential pressure between the cabin and the outside atmosphere of 5 lbs. per square inch. With the cabin pressure adjusted to a value corresponding to 6,000 feet of altitude and with the airplane at 18,000 feet of altitude, this differential is not exceeded and bellows 46 performs no function. However, if the aircraft should now rise to a higher altitude, the differential pressure will increase due to the lowering of the outside atmosphere pressure. When the aircraft reaches an altitude of approximately 19,500 feet, the limiting differential pressure will be reached, and bellows 46 will be so contracted thereby that pivot portion 50 will come into engagement with the end portion of lever 40. Any further increase in differential pressure will then cause further contraction of bellows 46 and cause rotation of lever member 40 in a counterclockwise direction. It has been previously noted that counterclockwise rotation of lever member 40 causes opening of outlet valve 10 to permit a release of excess pressure. Thus, as the airplane climbs above 19,500 feet, bellows 45 no longer controls the cabin pressure and differential pressure limiting bellows 46 becomes the controlling element. The cabin pressure will then vary as the aircraft continues to ascend. If the airplane should climb to an altitude of approximately 25,000 feet, then the cabin pressure would vary to a value corresponding to approximately 10,500 feet.

If the airplane would now descend, differential pressure limiting bellows 46 will continue to control the operation of valve 10 until the differential pressure falls below the adjusted value of 5 lbs. per sq. inch. If the airplane continues to descend, the cabin pressure will be maintained at a value corresponding to 6,000 feet of altitude until the airplane goes below 6,000 feet in elevation, or until knob 97 is adjusted to move member 86 to the right on member 74 and to incline caster wheel 81 in the opposite direction to cause movement of carriage member 74 to the left. The cabin pressure cannot be maintained at a value corresponding to 6,000 feet in elevation if the aircraft goes below that elevation because it is noted that control is exercised by controlling outflow of air and the air cannot flow from a space at a lesser pressure to a space at a greater pressure. Thus, if the airplane should go below 6000 feet elevation, the cabin pressure will vary accordingly and will tend to slightly exceed that of the atmosphere, due to the continued supply of air from the compressor. Further, inwardly opening check valves (not shown) may be provided in the aircraft structure to permit air flow therethrough whenever outside pressure exceeds cabin pressure.

Assuming that knob 97 has been adjusted to incline member 82 and caster wheel 81 in the opposite direction, member 74 will now move to the left and cause rotation of pinion 61 of motor 62 in a counterclockwise direction, thus loosening spring means 59. Loosening of spring means 59 tends to permit spring means 44 to bias lever 40 in a counterclockwise direction, thus permitting communication of chamber 21 with the cabin air and increasing the pressure in said chamber. This causes closing movement of the valve and tends to increase the cabin pressure. Here again, at any particular adjustment, a pressure in the cabin below that desired will permit spring 44 to move lever 40 in a direction to increase cabin pressure whereas a pressure in the cabin in excess of that desired will cause contraction of bellows 45 and move lever 40 in a clockwise direction to lift diaphragm 16 from its seat and relieve excess pressure. Member 74 will move to the left until 101 engages stop 103 at which time movement of 74 will continue although extension 101 does not continue moving. This will then cause member 82 to rotate in a direction tending to decrease the angularity of caster wheel 81 relative to cylinder 78 and gradually slow the movement of carriage member 74 to a stop.

The operation of the present apparatus using the outflow valve of Figure 6 is substantially the same as that above described. However, no differential pressure responsive means is provided for controlling this valve. In this modification, control is exercised over valve 10 by pilot valve 203 which in turn is controlled by cabin pressure responsive bellows 202, said bellows being adjusted by motor 204, as in the above example. As in said example, the position of diaphragm 16 is determined by the air pressure in chamber 21 relative to the pressure in the cabin and the outside atmosphere. As previously pointed out, the pressure in chamber 21 depends on the position of ball valve member 211, the said pressure approaching cabin pressure as member 211 is moved to the right and approaching atmospheric pressure as said member 211 is moved to the left. At any particular position of lever 219 of motor 204, a decrease in cabin pressure causes an expansion of bellows 202 and movement of member 211 to the right. This causes the pressure in chamber 21 to rise, thus moving diaphragm 16 toward closed position and causing the cabin pressure to rise because of the resulting decreased outflow. Likewise, increased cabin pressure causes a contraction of bellows 202, movement of valve member 211 to the left, a decrease in pressure in chamber 21 and an opening movement of diaphragm 16 which thus permits increased outflow and tends to lower the cabin pressure. Now, if spring 218 be tightened, ball valve member 211 is moved to the right and the cabin pressure is thus caused to increase until it is able to contract bellows 202 in opposition to said spring. In a somewhat similar manner, loosening spring 219 permits a contraction of bellows 202 thus moving member 211 to the left and reducing the absolute value of the cabin pressure.

Spring 218 is adjusted by lever 219 of motor means 204 in response to controller 70 in the same manner as motor 62 is operated by said controller. Motor 204 is energized by the circuit: line wire 225, wire 226, motor means 204, wire 227 and line wire 228. Motor 204 is connected to controller 70 by control wires 230, 231, and 232, as in the above example, and is so geared that lever 219 rotates clockwise as wiper 73 of controller 70 is moved to the right across resistor 71. Thus movement of member 74 to right causes a decrease in absolute cabin pressure and a reverse movement causes an increase, as in the previous example.

In both of the above modifications, a simple diaphragm valve is used to control cabin pressure and is itself controlled by pilot valve means operated by suitable condition responsive means adjusted by motor means. The motor means in turn is controlled by a controller at a predetermined timed rate and within predetermined limits. The apparatus is a simple, rugged and requires very little auxiliary power for its operation.

As a study of the present specification and drawings will show, there are many substitutions and equivalents that are usable in the practice of the present invention. Therefore, the scope of the present invention should be determined only by the appended claims.

I claim as my invention:

1. In an aircraft having a cabin supplied with air under a pressure higher than that of the surrounding atmosphere, means for controlling the air pressure within said cabin comprising, in combination, diaphragm valve means for controlling the flow of air from said cabin, pilot valve means for controlling the action of said diaphragm valve means, differential pressure responsive means for actuating said pilot valve means upon the attainment of a predetermined differential between the cabin pressure and atmospheric pressure, movable means responsive to the absolute pressure of the cabin for actuating said pilot valve, adjustable motor means for adjusting said absolute pressure responsive means, electrical means for controlling the operation of said motor means, motor driven means for adjusting said electrical means, adjustable stop means for limiting the amount of adjustment of said motor driven means, and manually controllable means for adjusting the rate of adjustment of said motor driven adjusting means.

2. In a structure having an enclosure supplied with air under pressure, said enclosure being surrounded by an atmosphere under less pressure, means for controlling the pressure within said enclosure, in combination, valve means for controlling out-flow from said enclosure to the surrounding atmosphere, fluid motor means for operating said valve means, pilot valve means for controlling said fluid motor means, movable means responsive to the pressure within said enclosure for actuating said pilot valve means, gradual acting motor means for adjusting said pressure responsive means, gradually adjustable control means for controlling said gradual acting motor means, and mechanical means for adjusting said control means, said adjusting means including a constant speed driving means and a variable speed transmission means.

3. In a structure including an enclosure supplied with air under a pressure exceeding that of the surrounding atmosphere, means for controlling air flow through said enclosure comprising, in combination, a valve including flexible diaphragm operating means for controlling air flow from said enclosure, cap means forming a chamber above said diaphragm with said diaphragm as the bottom portion of said chamber, valve means for controlling the flow of a fluid to and from said chamber in a manner to vary the pressure within said chamber, means responsive to the pressure within said enclosure for operating said valve means, electric motor means for adjusting said pressure responsive means, motor driven control means for proportionately controlling said motor means, and mechanical means for controlling the speed of said motor driven control means.

4. In a valve device for a pressurized aircraft cabin, in combination, an outlet air passage formed by conduit means, movable means including a flexible diaphragm for closing and opening said air passage, an annular portion of said diaphragm extending beyond said conduit means, means for securing the outer edges of said diaphragm in fixed relation to said conduit means, means exposing the underside of said annular portion of said diaphragm to the atmosphere immediately surrounding said valve device, chamber forming means located above and secured to the outer edges of said diaphragm, means including a pilot valve structure having passages communicating with said chamber, the inner portion of said conduit and the atmosphere immediately surrounding said valve device, movable means responsive to the pressure of said atmosphere for operating said pilot valve structure, expansible means responsive to the differential of said atmosphere and the pressure existing inside said air outlet, and electric motor means for adjusting said atmosphere pressure responsive means.

5. In an airflow control means for an aircraft, valve means for controlling said airflow, power means for operating said valve means, expansible means responsive to air pressure for controlling said power means, motor means for adjusting said pressure responsive means, and means for controlling said motor means, said controlling means comprising a motor control means, motor driven means for adjusting said motor control means, adjustable stop means for limiting the extent of adjustment of said adjusting means and mechanical means for varying the rate of adjustment of said adjusting means.

6. In an aircraft, cabin pressure control apparatus comprising, in combination; means for controlling airflow through said cabin; expansible means responsive to cabin pressure for controlling said airflow controlling means; power operated means for adjusting said pressure responsive means; and control means for said adjusting means including a rotatable cylinder, means movable longitudinally of said cylinder, said movable means including a caster wheel engaging said cylinder, mechanical means for adjusting and maintaining the position of said caster wheel relative to said cylinder, and means for connecting said movable means in controlling relation to said adjusting means.

7. In an aircraft, control apparatus comprising, in combination, a rotatable cylinder, a substantially constant speed motor for rotating said cylinder, means movable in directions parallel to the axis of said cylinder, guide means for said movable means, control means operated by said movable means, wheel means mounted on said movable means in rolling engagement with said cylinder, manually operable means for adjusting the attitude of said wheel means relative to said cylinder, and stop means in addition to said adjusting means for varying said attitude to a position in which said wheel means rolls parallel with said cylinder for thereby stopping said movable means.

8. In control means for aircraft cabin pressure control apparatus, in combination, a rotatable cylinder, motor means for rotating said cylinder, means movable along said cylinder including pivotally mounted wheel means in rolling engagement with said cylinder, control means adjustable by said movable means, mechanical means including a gear having its axis parallel with said cylinder for inclining said wheel means relative to said cylinder so that rotation of said cylinder may cause movement of said movable means along said cylinder, and manually operated pinion means engaging said gear for operating said inclining means regardless of the location of said movable means, said pinion means being parallel with said cylinder and having a length at least equal to the travel of said movable means along said cylinder.

9. In control apparatus, in combination, a rotatable cylinder means, a substantially constant speed motor means for rotating said cylinder means, means movable in directions parallel to the axis of said cylinder means, guide means for said movable means, wheel means mounted on said movable means in rolling engagement with said cylinder means, mechanical means for adjusting the angular relation of said wheel to said cylinder means, strain release means between said wheel and said movable means normally maintaining said angular relation, and adjustable stop means for limiting the travel of said movable means by coacting with said strain release means in a manner to alter said angular relation.

10. In a structure having an enclosure supplied with air under pressure, said enclosure being surrounded by an atmosphere under less pressure, means for controlling the air pressure within said enclosure comprising, in combination, valve means for controlling airflow through said enclosure, fluid motor means for actuating said valve means, pressure responsive flow control means for varying the fluid pressure in said fluid motor to cause operation thereof between limits, mechanical means for adjusting said varying means at a timed rate, and means including a stop coacting with strain release means for gradually varying said adjusting rate to zero as a limit is reached.

DANIEL G. TAYLOR.

REFERENCES CITED

The following references are of record in the file of this patent:

UNITED STATES PATENTS

| Number | Name | Date |
|---|---|---|
| 402,674 | Judson | May 7, 1889 |
| 1,575,725 | Stewart | Mar. 9, 1926 |
| 1,803,958 | Cadwell et al. | May 5, 1931 |
| 2,185,500 | Crosthwait, Jr., et al. | Jan. 2, 1940 |
| 2,204,638 | Weathers | June 18, 1940 |
| 2,215,678 | Weathers | Sept. 24, 1940 |
| 2,244,722 | Norcross | June 10, 1941 |
| 2,257,617 | Pervelis | Sept. 30, 1941 |
| 2,307,199 | Cooper | Jan. 5, 1943 |
| 2,316,649 | Jurs | Apr. 13, 1943 |
| 2,346,437 | Krogh | Apr. 11, 1944 |
| 2,382,105 | Sarver | Aug. 14, 1945 |
| 2,391,197 | Schwein | Dec. 18, 1945 |
| 2,399,326 | Crot | Apr. 30, 1946 |
| 2,402,681 | Schroeder | June 25, 1946 |
| 2,419,707 | Cooper et al. | Apr. 29, 1947 |
| 2,424,491 | Morris | July 22, 1947 |
| 2,450,881 | Cooper et al. | Oct. 12, 1948 |
| 2,463,489 | Kemper | Mar. 1, 1949 |

FOREIGN PATENTS

| Number | Country | Date |
|---|---|---|
| 521,623 | Great Britain | May 27, 1940 |